Sept. 5, 1961 K. KLUG 2,998,628
TUBE OR HOSE BINDER
Filed March 24, 1958 2 Sheets-Sheet 1
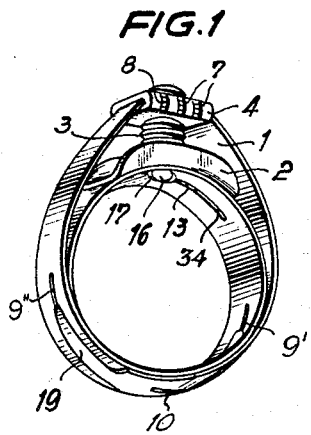
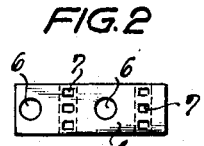
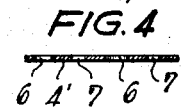
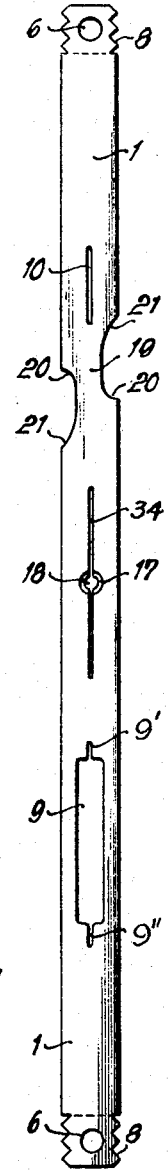
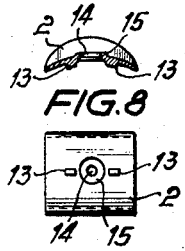
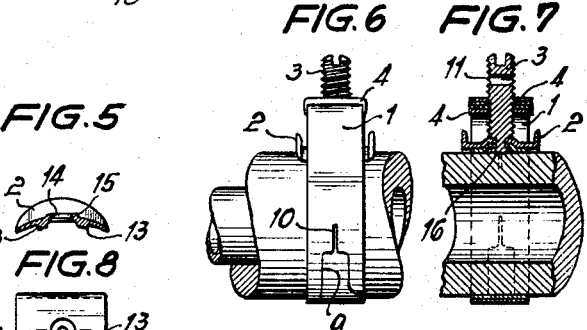
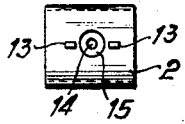
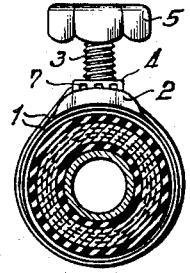
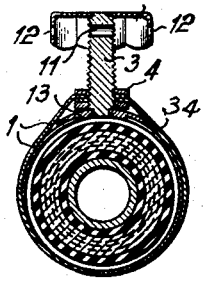
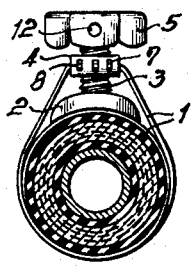
INVENTOR:
Karl KLUG
By: Wenderoth, Lind & Ponack
Attys Sept. 5, 1961  K. KLUG  2,998,628
TUBE OR HOSE BINDER
Filed March 24, 1958  2 Sheets-Sheet 2
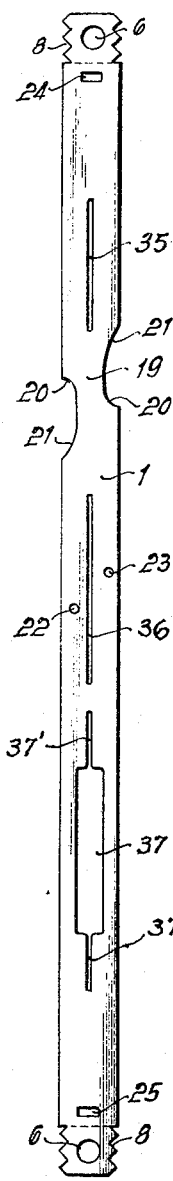
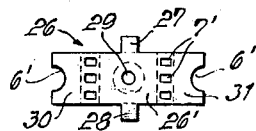
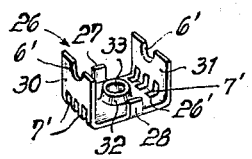
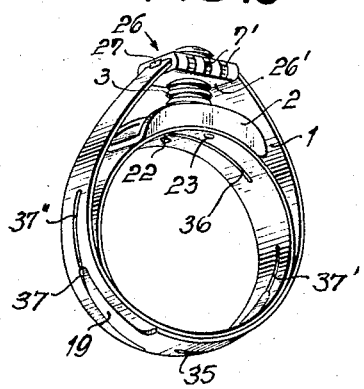
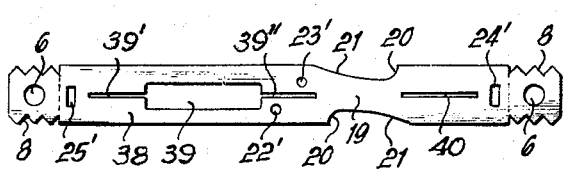
INVENTOR
Karl Klug
By
Wenderoth, Lind & Ponack
Attys

United States Patent Office 2,998,628
Patented Sept. 5, 1961

2,998,628
TUBE OR HOSE BINDER
Karl Klug, Nurnberg, Germany
(Bahnhofstrasse, Klausen, Italy)
Filed Mar. 24, 1958, Ser. No. 730,031
Claims priority, application Germany Mar. 28, 1957
9 Claims. (Cl. 24—278)

There are plenty of types of hose clamps already known on the market; with very few exceptions, these assemblies are designed to function in such a way that a strip of metal or length of wire is laid round the hose so that its ends can be drawn tight with an adjusting screw and nut. Automatically, this means that pull is exerted at one or both ends of the clamp as the adjusting screw is tightened, with the result that any difference in the diameters of the pipe and hose will cause a dangerous fold to be formed in the hose; this condition can be avoided to a certain degree by using ordinary rubber hose in place of the now exceedingly popular plastic hose. Plastic hoses can only be fitted safely and securely to a pipe of any kind by using accurately functioning hose clamps designed so that their pressure is exerted concentrically round the circumference of the hose.

Even more disastrous results will be obtained with a normal type of clamp when the hose to be fitted is covered with a braided-steel cover. Under such circumstances, one usually has to resort to using a hose clamp consisting of a length of strip steel together with a tightening screw and a concave-shaped clamping segment to reduce and increase the tension and pressure applied by the length of strip to the hose; also, by forming the length of steel strip into a loop within a loop, the effective circumference of the clamp can be enlarged or reduced at will.

Several clamps of this kind are already well known. In one of these clamps a strip steel is riveted to the bottom of a clamping strip assembly, into which an adjusting screw is threaded on the face of the clamping strip. After forming the loop the free ends of the strip provided with holes are placed on the adjusting screw. They lie against a nut sliding on the adjusting screw. The projecting ends of the strip then are bent so that they overlap other portions of the strip. Where there are cutaway portions in the length of the strip steel, the forming of the strip into a loop causes extremely uneven distribution of tension. Often the strip steel is cadmium-plated for rust prevention. Such cadmium-plating also causes an uneven distribution of tension when the strip is formed into a loop. Also, such a clamp takes an extremely long time to manufacture for, with the exception of one or two parts only, the rest are hand-made; the many cutaway portions and rivet holes (particularly in the clamping segment where the rivet holes are located directly opposite each other) cause the strip to buckle easily at various points and therefore reduce the flexibility of the clamp. Additionally, the doubling of the steel strip over the nut on the adjusting screw imparts additional springiness to this portion of the strip (already weakened on account of the cutaway portions) with the result that even though the adjusting screw may be tightened up fully, the outer portion or loop of the strip will act as a spring; this extra springiness in the clamp will only be effectively reduced after the clamp has been in constant use for a long period of time. In the remaining portions of the clamp, the greater the thickness of the cadmium plating, the greater the tendency towards buckling. The length of the adjusting screw used is also limited on account of the fact that the screw itself together with the bridge is riveted firmly on the steel strip and the free ends of the strip after it is formed into a loop have to be placed on the adjusting screw. The ends of the strip have to be laid loosely by hand round the nut of the adjusting screw which means that inaccuracies can easily occur to automatically cause a certain amount of extra unevenness in tension.

Due to the complete absence of any overlapping or doubling over of the strip ends, the clamp of this invention saves an appreciable amount of material; the absence of any riveted joints saves a large amount of hand processing and enables the manufacturing process to be carried out more economically. Further advantageous features are increased safety at high pressures, a larger range of use, easier installation, a balancing out of excessive differences in tension, and a reduction in the tendency to buckle at points where the strip is cut away.

The invention will now be described with reference to the accompanying drawings, in which:

FIG. 1 is a perspective view of a hose clamp according to the present invention;

FIG. 2 is a plan view of a punched out section of a strip prior to being bent up to form a clamp fastener for the hose clamp of FIG. 1;

FIG. 3 is a plan view of the strip of material which is bent into the clamp of FIG. 1;

FIG. 4 is a sectional view of the punched out section of FIG. 2;

FIG. 5 is a sectional elevation view of a clamping segment used in the hose clamp of FIG. 1;

FIG. 6 is a side elevation view of the hose clamp of FIG. 1 in position on a hose;

FIG. 7 is a sectional view of the hose clamp as shown in FIG. 6;

FIG. 8 is a plan view of the clamping segment of FIG. 5;

FIG. 9 is an elevation view of a modified form of hose clamp according to the invention in the untensioned condition;

FIG. 10 is a sectional view of the hose clamp of FIG. 9;

FIG. 11 is an elevation view of the hose clamp of FIG. 9 in the tightened position;

FIG. 12 is a plan view of a strip of material for use in a modified form of hose clamp according to the invention;

FIG. 13 is a plan view of a punched out strip which is bent up into a clamp fastener for use with the strip of FIG. 12;

FIG. 14 is a perspective view of the punched out strip of FIG. 13 after it has been partially bent into its final shape;

FIG. 15 is a perspective view of a modified form of hose clamp according to the invention using the parts illustrated in FIGS. 12–14; and FIG. 16 is a plan view of a strip of material for use in a modified form of hose clamp according to the invention.

FIG. 1 shows a hose clamp according to the invention, in a semi-closed position in which the tensioning screw 3 is a slotted-head type.

FIG. 7 shows a similar hose clamp with the exception that the tightening screw is provided with a drilled hole 11. This hole fulfills a double purpose: when no screwdriver is available, the hose clamp can be tightened up or loosened by means of a nail, split pin, or other similar object; secondly, the hole can be used to receive a split pin or a seal of some kind (to meet regulations drawn up by Trade Associations or insurance corporations demanding that certain safety precautions be taken).

FIG. 9 shows an identical type of hose clamp except that the tightening screw 3 has been provided with a hexagonal cap so that the clamp can be tightened or loosened either by hand or with the help of a spanner.

FIGS. 10 and 11 show a similar type of hose clamp with the exception that the tightening screw 3 is provided with a drilled hole 11 and the hexagonal cap 5 is further provided with two holes 12. These enable the cap and screw to be split-pinned or sealed in place (to conform with certain current local safety regulations). The hose clamps illustrated in the several modifications comprise the usual length of strip steel formed into a loop within a loop in the normal manner; the length of strip steel used for this invention differs from other types though in that it is provided with a series of tension compensating slots 9, 10 and 34 (FIG. 3), 35, 36 and 37 (FIG. 12), and 39 and 40 (FIG. 16). Slots 9, 37 and 39 each have narrower slots 9' and 9" (FIG. 3), 37' and 37" (FIG. 12), and 39' and 39" (FIG. 16) extending from opposite ends thereof. The strips have the slots running parallel to the center line of the strip and designed to compensate any non-uniform or uneven tension applied to the length of strip; also, the screw holes 6 in the strip act as a thread for the screw. Both ends of the length of strip are provided with serrations 8 on each of their sides designed to fit into the hose clamp fastener 4 shown in FIGS. 2 and 4; the serrations 8 engage with the holes 7 cut into the hose clamp fastener 4.

After forming the length of strip material into a loop, the flat length of clamp fastener 4 is folded round the two ends of the loop in such a manner that the two holes in the fastener mate accurately, the serrations on the strip ends are located accurately one over the other, and the serrations themselves engage in the holes provided for this purpose in the fastener; after being bent to shape, the fastener is pressed firmly together.

The tension-compensating slots 10 as described above together with the cutaway portions 20 and 21 of the length of strip 1 (FIGS. 3 and 12) or 38 (FIG. 16) simplify the threading of the strip material through the slot 9 (FIG. 3), 37 (FIG. 12), or 39 (FIG. 16), and safely prevent the strip material from buckling. The long neck 19 formed in the strip by the provision of the two cutaway portions 20 and 21 together with the longer, suitable shaped slot 9, 37 or 39 give the clamp the largest possible range of diameters to which it can be adjusted, added to which the neck itself is shaped in such a manner that the strip can move easily and accurately as the clip is tightened or loosened. Just like other conventional types of hose clip or clamp, this newer type is also provided with a concave-shaped clamping segment. On this newer type though, the clamping segment assembly is not firstly riveted to the tightening screw 3 before being riveted to the strip material; in this case, the length of strip material 1 is provided with a hole 18 and a circular countersink 17. Both of these are produced at the same time as the length of strip is punched out.

The clamping segment 2 shown in FIGS. 1, 5 and 8, is provided on its lower face with two lugs 13 which engage in the central slot of the tension-compensating slots in the strip to prevent the clamping segment 2 from being forced to one side as the tightening screw 3 is tightened up. The tightening screw 3 is threaded down through the threaded hole in the clip fastener and through the holes in the two ends of the strip material until the cylindrical stud at the lower end of the tightening screw 3 projects through the hole 14 in the clamping segment 2 and also through the hole 18 in the length of strip material. Following this, the cylindrical stud at the end of the tightening screw 3 is spot-punched until it no longer projects beyond the inner face of the strip material, and so as to fill out the circular countersink 17 located in the inner face of the strip. The hose clip can be brought to the required size by screwing the tightening screw 3 either up or down; after being fitted in place over the hose, the clip is tightened by tightening the screw 3. On account of the pressure applied equally all round the circumference of the hose, this type of clip is ideal for use of high-pressure hoses; it can be fitted and removed extremely quickly either with or without the help of a tool, and even with the most primitive means.

In order to increase the resistance to buckling on the clamping segment the strip according to FIG. 12 can also be secured to the clamping segment 2 through holes 22, 23 provided on both sides of slot 36 and staggered in the direction of the length of the strip. This construction prevents the weakening of the strip along one cross section only, reducing at the same time the friction of the strip on the hose so that the hose clamp slips easier when the tensioning screw is tightened. This enables the use of a broad strip of material. It is understood of course that hose clamps of broad strip steel give a better sealing than those with a narrow strip. Besides it is easier to mount such types of hose clamp because they fit snugly on the hose so that it is also easier to tighten the tensioning screw.

In the length of strip material shown in FIG. 16, which is particularly suited for small hose clamps, the portions 39' and 39" of slot 39 and the small slot 40 on the right end of the strip come together beneath the clamping segment. The holes 22', 23' which are staggered in the direction of the length of the strip are arranged on both sides of this slot. In the two lengths of strip material according to FIGS. 12 and 16 the ends of the strip are also provided with holes 24, 24' and 25, 25' in which engage the lugs described hereafter of a modified type of clamp fastener 26 shown in FIG. 15. This clamp fastener 26 is obtained from the punched section shown in FIG. 13. The punched section consists of a rectangular strong metal sheet 26' provided with semi-circular cutaway portions 6' on the two front ends, lugs which are more or less rectangular in the center of the two side walls and a hole 29 of a smaller diameter than that of the thread for the tensioning screw 3 in the center of the punched section.

This punched section is bent into the shape of a U by bending the two lobes 30, 31 on the dotted lines and bending the lugs 27, 28, as shown in FIG. 14. Besides, a pin not shown in the drawing is introduced in hole 29 and the metal is formed with the help of conventional tools into a stud 32 for the threaded bushing of tensioning screw 3. Stud 32 can be formed towards the interior of the U-shaped clamp fastener as shown in FIG. 14 or in opposite direction to the two side parts 30, 31. The stud should be provided with a hole 33 of the same diameter as the root diameter of tensioning screw 3. A thread will then be cut in this hole 33 for the tightening screw 3. The outer diameter of stud 32 must be great enough to allow the strip ends to be put with the holes 6 in a snug fit on the stud as shown in FIGS. 12 and 16. The lugs 27, 28 are gripped through the corresponding holes 24, 24' and 25, 25'. Subsequently the side parts 30, 31 will be bent inwardly so that the semi-circular cutaway portions 6' join and form a hole for stud 32 so that the flat clamp fastener 26 of FIG. 15 is formed. The ends of the strip material will then be secured by pressing the clamp fastener firmly together. In this case the thread for the tightening screw 3 is not formed by holes 6 in the strip material and the hole in the punched section but by stud 32 shaped in form of a bushing. There is thus formed a relatively long thread in which the tightening screw 3 can be easily turned by hand as it is known from experience. Besides, the holes 6 in the strip will not tear out because the strip ends are not only secured by holes 6 but also by lugs 27, 28, which prevent the twisting of the clamp fastener 26 towards the ends while they are pressed together. It is not necessary that the holes 24, 25 and 24', 25' be rectangular; they may also have an oval or circular form.

In the clamp fastener shown in FIGS. 13, 14 and 15 the teeth 8 on both sides of the strip ends may be omitted and be replaced by straight edges aligned with the strip, as the lugs 27, 28 and stud 32 together with the holes 24, 25 and 24', 25' and 6 provide a secure mounting for the ends in the clamp fastener 26, so that they cannot twist, slip or be torn out.

I claim:

1. A hose binder for securing a hose to a pipe comprising an elongated strip of material with an opening therein through which one end of said strip has been passed to form an inner and an outer loop for encircling the hose with the inner loop, a clip receiving and fastening the ends of said strip to each other and to said clip, a clamping segment mounted on and conforming to the shape of said inner loop of said strip, and a tensioning screw threaded into said clip and pressing against said clamping segment for pulling the inner loop tightly around the hose, said strip being apertured for increasing the ability of the strip to adjust in the transverse direction to tension in the strip and for reducing the tendency of said strip to buckle along said clamping segment, and having means on the ends thereof engaging the clip.

2. A hose clamp as claimed in claim 1 wherein the opening in said strip for interleaving the loops is elongated, said opening having small slots at both ends along the central axis of said strip for increasing the ability of the strip to adjust in the transverse direction to tension in the strip.

3. A hose clamp as claimed in claim 1, wherein said strip has a slot approximately along the longitudinal axis of said strip at least along the portion of the inner loop contacted by said clamping segment for increasing the ability of the strip to adjust in the transverse direction to tension in the strip.

4. A hose clamp as claimed in claim 3, wherein said clamping segment is mounted on said strip at a single point along said slot.

5. A hose clamp as claimed in claim 1 in which as part of said aperture said strip has a small elongated slot along the central longitudinal axis of the portion of said inner loop contacted by said clamping segment, and said clamping segment is attached to said strip at two points spaced one from the other along the length of said strip and on opposite sides of said small elongated slot.

6. A hose clamp as claimed in claim 1, wherein said clip surrounds both ends of said strip and has several apertures in both sides thereof and forms a bushing for the tensioning screw, said strip having corresponding holes in the ends thereof and having laterally projecting teeth engaging in said holes in said clip, said bushing comprising means for guiding said tensioning screw.

7. A hose clamp as claimed in claim 1, wherein said clip has means for guiding said tensioning screw comprising a projecting threaded bushing for guiding said screw, and lugs at both ends of said clip placed on the longitudinal axis of said strip, both ends of said strip having apertures therein engaging over said lugs for releasing said screw from shearing stresses exerted by the ends of said strip when said screw is threaded against said clamping segment.

8. A hose clamp as claimed in claim 7 in which said threaded bushing projects into the corresponding holes at both ends of said strip, the ends of said strip being placed one over the other on said bushing.

9. A hose clamp as claimed in claim 1 in which said strip has recesses in opposite side edges for enabling the strip to be passed through the opening therein, said recesses being at least partially offset longitudinally from each other along said strip.

References Cited in the file of this patent

UNITED STATES PATENTS

| | | |
|---|---|---|
| 2,392,210 | Zaleske | Jan. 1, 1946 |
| 2,453,434 | Harder | Nov. 9, 1948 |

FOREIGN PATENTS

| | | |
|---|---|---|
| 540,748 | Canada | May 7, 1957 |
| 899,437 | Germany | Dec. 10, 1953 |
| 1,000,017 | France | Oct. 10, 1951 |
| 1,035,161 | France | Apr. 15, 1953 |
| 1,112,038 | France | Nov. 9, 1955 |